United States Patent
Kim et al.

(10) Patent No.: US 9,774,381 B2
(45) Date of Patent: Sep. 26, 2017

(54) TRANSMITTER, RELAY, RECEIVER, AND COOPERATIVE COMMUNICATION SYSTEM USING NETWORK COMPRESS-AND-FORWARD SCHEME

(71) Applicant: SAMSUNG ELECTRONICS CO., LTD., Suwon-si (KR)

(72) Inventors: Kwang Taik Kim, Yongin-si (KR); Sung Hoon Lim, Yongin-si (KR); Kyung Hun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/153,680

(22) Filed: Jan. 13, 2014

(65) Prior Publication Data
US 2014/0226699 A1    Aug. 14, 2014

(30) Foreign Application Priority Data

Feb. 12, 2013 (KR) .................... 10-2013-0014858

(51) Int. Cl.
*H04B 7/15* (2006.01)
*H04L 1/00* (2006.01)

(52) U.S. Cl.
CPC ............ *H04B 7/15* (2013.01); *H04L 1/0041* (2013.01); *H04L 1/0071* (2013.01); *H04L 1/0077* (2013.01); *H04L 2001/0097* (2013.01)

(58) Field of Classification Search
USPC .................... 375/211, 240.03, 260, 299, 349
See application file for complete search history.

(56) References Cited

U.S. PATENT DOCUMENTS

| | | | |
|---|---|---|---|
| 7,706,365 | B2 | 4/2010 | Effros et al. |
| 7,916,665 | B2 | 3/2011 | Le Bars et al. |
| 2006/0115015 | A1 | 6/2006 | Oh et al. |
| 2006/0291440 | A1 | 12/2006 | Hausl et al. |
| 2007/0297498 | A1 | 12/2007 | Kramer |
| 2008/0075080 | A1 | 3/2008 | Katabi et al. |
| 2010/0157878 | A1 | 6/2010 | Zeitler et al. |

(Continued)

FOREIGN PATENT DOCUMENTS

| | | |
|---|---|---|
| KR | 1020090124631 A | 12/2009 |
| KR | 100942889 B1 | 2/2010 |

(Continued)

OTHER PUBLICATIONS

International Search Report, dated Mar. 31, 2014, issued by the International Searching Authority in counterpart International Application No. PCT/KR2013/011937.

*Primary Examiner* — Kabir A Timory
(74) *Attorney, Agent, or Firm* — Sughrue Mion, PLLC (57) ABSTRACT

A cooperative communication system is provided. The cooperative communication system includes a transmitter that generates a codeword from data blocks based on a long message encoding scheme, and multicasts a signal including the codeword; relays, each relay configured to receive the multicasted signal, encode the multicasted signal using a encoding scheme independent from encoding schemes of other relays to generate a random-mapped signal of the data blocks, and relay the random-mapped signal of the data blocks; and a receiver that receives signals relayed by the relays, and generates the data blocks from the signals based on a joint decoding scheme.

15 Claims, 11 Drawing Sheets

(56) References Cited

U.S. PATENT DOCUMENTS

| | | | |
|---|---|---|---|
| 2011/0080893 A1* | 4/2011 | Fong et al. | 370/331 |
| 2011/0096718 A1* | 4/2011 | Yang | H04B 7/18582 370/316 |
| 2011/0321106 A1 | 12/2011 | Takahashi et al. | |
| 2012/0275548 A1* | 11/2012 | Oh et al. | 375/341 |

FOREIGN PATENT DOCUMENTS

| | | |
|---|---|---|
| KR | 100959065 B1 | 5/2010 |
| KR | 1020110084083 A | 7/2011 |
| KR | 101103077 B1 | 1/2012 |
| WO | 2011/024260 A1 | 3/2011 |

\* cited by examiner

TRANSMITTER, RELAY, RECEIVER, AND COOPERATIVE COMMUNICATION SYSTEM USING NETWORK COMPRESS-AND-FORWARD SCHEME

CROSS-REFERENCE TO RELATED APPLICATION

This application claims priority from Korean Patent Application No. 10-2013-0014858, filed on Feb. 12, 2013, in the Korean Intellectual Property Office, the entire disclosure of which is incorporated herein by reference.

BACKGROUND

1. Field

Methods and apparatuses consistent with exemplary embodiments relate to a transmitter, a relay, a receiver, and a cooperative communication system using a network compress-and-forward scheme.

2. Description of the Related Art

An operating method of a relay may be distinguished by three schemes. In an amplify-and-forward scheme, the relay may transmit an amplified version of a received signal in a previous time slot. In a decode-and-forward scheme, the relay may decode a source message included in a predetermined time slot, re-encode the decoded message in a subsequent time slot, and transmit the re-encoded message. In a compress-and-forward scheme, the relay may quantize a received signal in a predetermined time slot, encode the quantized signal in a subsequent time slot, and transmit the encoded signal.

SUMMARY

According to an aspect of an exemplary embodiment, there is provided a transmitter including an encoder that receives an input of multiple data blocks, and encodes the multiple data blocks to generate multiple codewords, and a modulator that modulates the multiple codewords, respectively, to generate multiple modulated signals. The encoder may encode the multiple data blocks, in an independent manner, to generate the multiple codewords.

The multiple codewords may include a first codeword and a second codeword, and the encoder may encode the multiple data blocks using a first code to generate the first codeword, and encode the multiple data blocks using a second code to generate the second codeword.

The modulator may employ a modulation scheme determined based on a length of a codeword generated by the encoder and a number of symbols included in a modulated signal generated by the modulator. The number of the symbols may be predetermined.

The encoder may include a receiving unit that receives a transmitted message including the multiple data blocks, and a partitioner to partition the transmitted message into the multiple data blocks.

The transmitter may further include a transmitter that multicasts a modulated signal generated by the modulator to multiple relays. The multiple relays may respectively relay signals multicasted by the transmitter, based on a network compress-and-forward scheme.

The transmitter may further include a network type determiner that determines a type of a network associated with a length of a path between the transmitter and a receiver, and a second encoder that receives an input of a single data block based on the type of the network determined by the network type determiner, and encode the single data block to generate a codeword corresponding to the single data block. The modulator may modulate the codeword generated by the second encoder.

According to another aspect of an exemplary embodiment, there is provided a relay that relays a data block transmitted from at least one transmitter to at least one receiver in a network including at least one transmitter, multiple relays, and at least one receiver, the relay and each of the multiple relays including a receiving unit that receives a radio signal including the data block, a demodulator that demodulates the received signal, a quantizer that quantizes the demodulated signal based on a predetermined compression level, an encoder that encodes the quantized signal, a modulator that modulates the encoded signal, and a transmitter that transmits the modulated signal. Respective encoders included in the multiple relays may perform encoding independently.

The respective encoders included in the multiple relays may perform encoding independently for the data block to be mapped randomly.

The quantizer may include at least one of a compression level adjuster that adjusts the predetermined compression level based on a desired rate of the network, a scalar quantizer that quantizes multiple symbols included in the demodulated signal, respectively, and a vector quantizer that quantizes a sequence of the multiple symbols included in the demodulated signal.

The relay may further include an entropy encoder that performs entropy encoding with respect to the quantized signal. The encoder may encode the signal by the entropy encoder.

The relay may further include an interleaver that interleaves the encoded signal. The modulator may modulate the interleaved signal.

According to another aspect of an exemplary embodiment, there is provided a receiver including a receiving unit that receives a signal in which multiple radio signals relayed by multiple relays are superposed, a demodulator that demodulates the received signal to generate a codeword, a codeword accumulator that accumulates a predetermined number of codewords, and a decoder that performs joint decoding with respect to the predetermined number of codewords to generate multiple data blocks.

The multiple radio signals may include signals transmitted from different transmitters, and the decoder may generate data blocks corresponding to the transmitted signals, respectively.

The receiver may further include a network type determiner that determines a type of a network associated with a length of a path between a transmitter and the receiver, and a second decoder that decodes the generated codeword, based on the type of the network determined by the network type determiner.

According to another aspect of an exemplary embodiment, there may also be provided a cooperative communication system using a network compress-and-forward scheme, the cooperative communication system including a transmitter that encodes multiple data blocks based on long message encoding, and multicasts a signal containing a result of the encoding, a plurality of relays that relay the multicast signal, based on the network compress-and-forward, and a receiver that accumulates a signal corresponding to a predetermined length, the signal being a signal in which a plurality of signals relayed by the plurality of relays are superposed, and restore the plurality of data blocks by performing joint decoding with respect to the accumulated signal.

BRIEF DESCRIPTION OF THE DRAWINGS

The foregoing and other aspects will become apparent and more readily appreciated from the following detailed description of certain exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

Exemplary embodiments are directed to a practical framework for implementing noisy network coding. By way of an example, in a noiseless network, a receiver has separate inputs for the respective input links, and thus, the receiver may receive relay signals relayed by the respective relays through separation in channels. That is, the receiver may receive a data packet through channel 1, and the receiver may receive another data packet through channel 2, either at separate times or the same time. By contrast, in a noisy network, a receiver receives the relay signals relayed by multiple relays absent a separation in channels. In such a case, the receiver receives a signal in which multiple relay signals relayed by multiple relays are superimposed.

Figure 1:
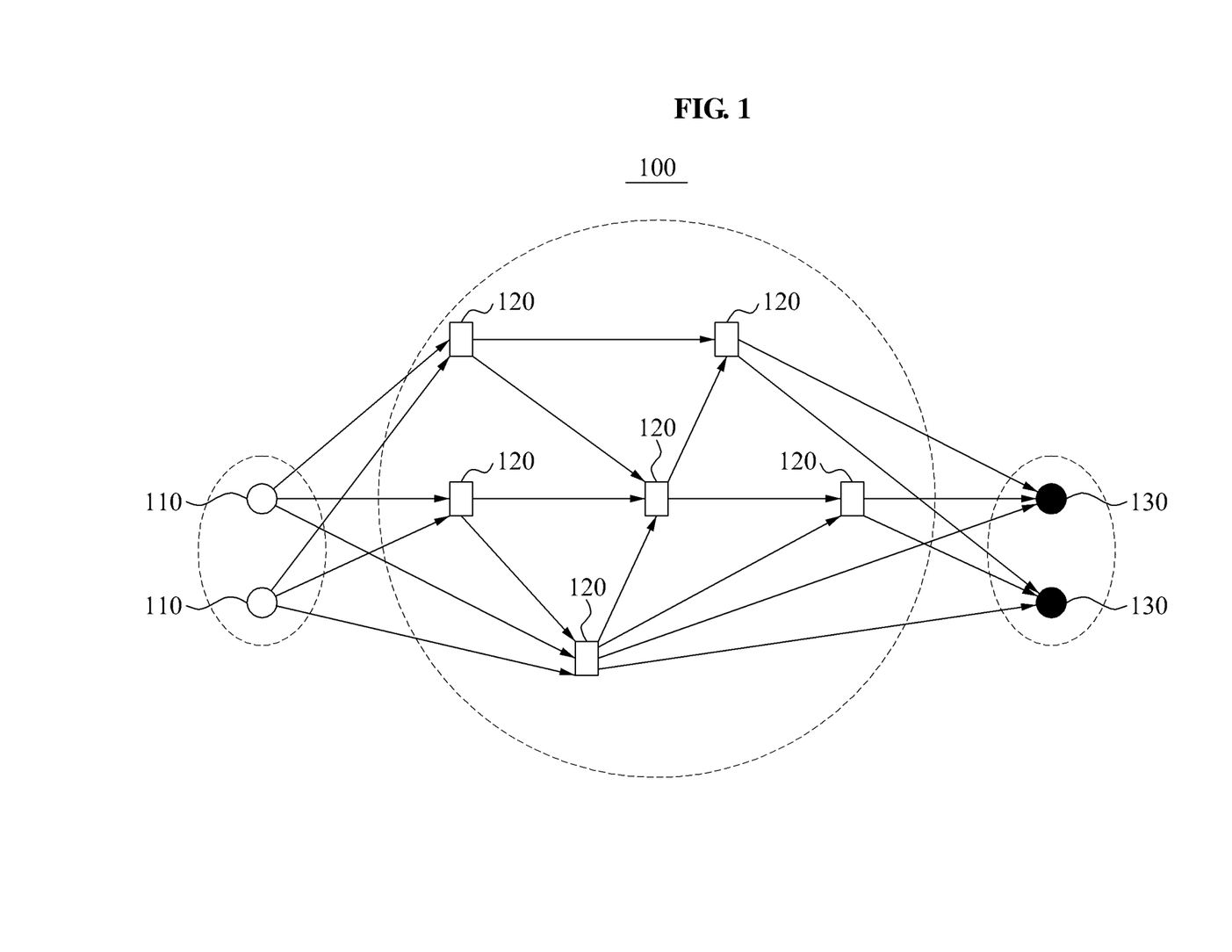
FIG. 1 is a diagram illustrating a cooperative communication system using a network compress-and-forward scheme according to an exemplary embodiment.

FIG. 1 is a diagram illustrating a cooperative communication system using a network compress-and-forward scheme according to an exemplary embodiment.

Referring to FIG. 1, a cooperative communication system 100 may include at least one transmitter 110, multiple relays 120, and at least one receiver 130.

Here, at least one transmitter 110 may transmit a data packet to be transmitted to at least one receiver 130. In this instance, at least one transmitter 110 may transmit the data packet to at least a portion of the multiple relays 120 using multicasting. The multiple relays 120 may relay the data packet transmitted by at least one transmitter 110 to at least one receiver 130. Here, a data packet refers to information to be transmitted by a certain transmitter. For example, a first transmitter may multicast a first data packet, and a second transmitter may multicast a second data packet. The receiver in a noisy network may receive a signal in which the first data packet is included, and a signal in which the second data packet is included absent separation in channels. In particular, the receiver receives the signal in which multiple relay signals are superimposed, and may extract a certain data packet (the first data packet and/or the second data packet) from the received signal. Thus, in FIG. 1, multiple arrows pointing in a direction of the receivers 130 denote multiple relay signals transmitted by the relays 120, and each of the receivers 130 may receive a signal in which such multiple relay signals are "superposed."

In this instance, at least one transmitter 110 may employ long message encoding. In particular, at least one transmitter 110 may generate a b number of codewords using a b number of data blocks. Here, b may be an integer greater than "1". At least one transmitter 110 may generate the b number of codewords, in an independent manner. For example, at least one transmitter 110 may employ different encoding schemes to generate the b number of codewords, respectively. A detailed description on the long message encoding will be provided with reference to FIGS. 2A through 2C.

The multiple relays 120 may relay the data packet, based on a network compress-and-forward scheme. In this instance, the multiple relays 120 may relay the data packet using independent channel encoders. Accordingly, the multiple relays 120 may enable substantially random mapping of relayed data packets. A detailed description of relaying methods of the multiple relays 120 will be provided with reference to FIGS. 3A through 3D.

At least one receiver 130 may receive a signal in which multiple signals relayed by the multiple relays 120 are superposed. In this instance, at least one receiver 130 may accumulate the received signal corresponding to a predetermined length, and perform joint decoding with respect to the accumulated signal, thereby restoring the data packet transmitted by at least one transmitter 110.

For example, a transmitter T1 may transmit a data packet to be transmitted to a receiver R1. In this instance, the data packet transmitted by the transmitter T1 may be relayed by multiple relays. The receiver R1 may receive a signal in which the multiple relay signals relayed by multiple relays are superposed. The receiver R1 may accumulate the received signal corresponding to a predetermined length, and restore the data packet transmitted by the transmitter T1, based on the accumulated signal. That is, for example, a superposed signal received at a certain point may include information on a first data packet and a second data packet. However, the first superposed signal received at the first point differs from the second superposed signal received at a second point. The receiver extracts the corresponding data packet based on the accumulated results, after accumulating a number of superposed signals corresponding to the extracted desired data packet.

According to another exemplary embodiment, a transmitter A and a transmitter B may transmit data packets to be transmitted to a receiver C, respectively. In this instance, the receiver C may receive a signal in which the data packet transmitted by the transmitter A and the data packet transmitted by the transmitter B are superposed. The receiver C may accumulate the received signal corresponding to a predetermined length. The receiver C may apply joint decoding to the accumulated signal, thereby decoding the data packet transmitted by the transmitter A and the data packet transmitted by the transmitter B, simultaneously. A detailed description on the joint decoding will be provided with reference to FIG. 4.

In practice, the cooperative communication system may provide a network framework using theoretical coding for the network compress-and-forward scheme.

In addition, the cooperative communication system may be used as a physical layer technology of a next generation network using a centralized network along with a distributed network.

FIGS. 2A through 2E are diagrams illustrating a transmitter according to an exemplary embodiment.

Figure 2A:
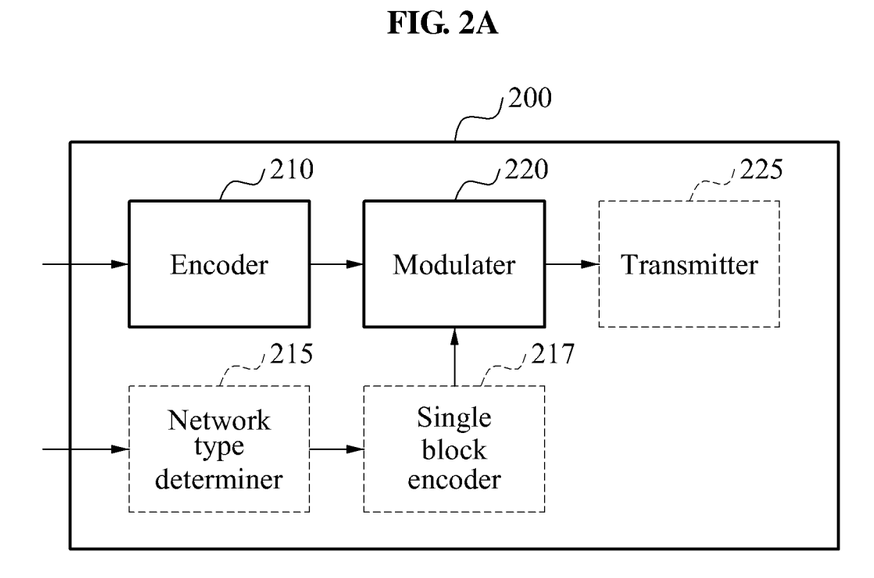
FIGS. 2A through 2E are diagrams illustrating examples of transmitters according to exemplary embodiments.

Referring to FIG. 2A, a transmitter 200 may include an encoder 210, and a modulator 220.

Figure 2B:
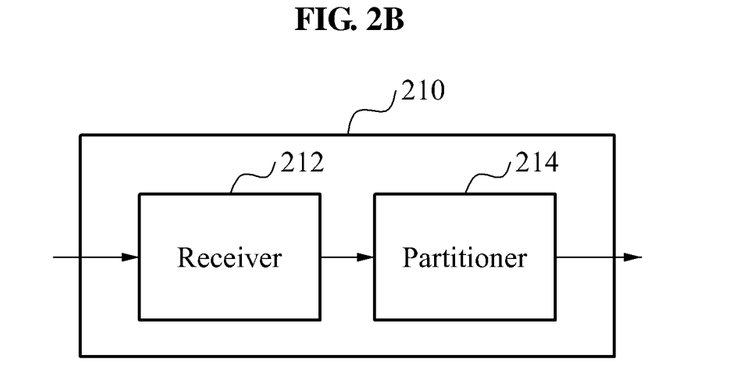

The encoder 210 may receive an input of multiple data blocks, and encode the multiple data blocks to generate multiple codewords. Here, the encoder 210 may receive the input of the multiple data blocks using various schemes. For example, as shown in FIG. 2B, the encoder 210 may include a receiver 212 that receives a transmitted message including multiple data blocks, and a partitioner 214 that partitions the received message into the multiple data blocks. As another example, the encoder 210 may receive the multiple data blocks, sequentially.

In this instance, the encoder 210 may encode the multiple data blocks independently to generate multiple codewords. Here, the encoder 210 may include a channel encoder, and may use a block coding technique.

Figure 2C:
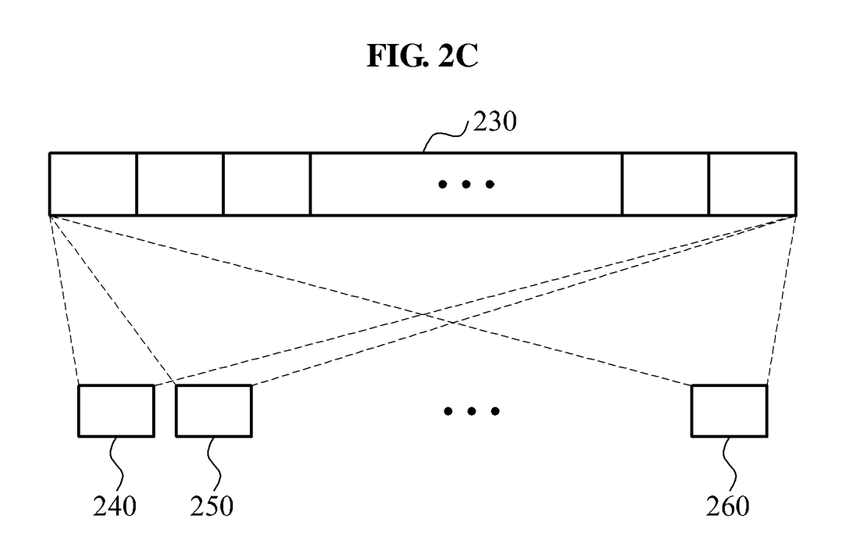

Referring to FIG. 2C, the encoder 210 may perform long message encoding basically based on data blocks 230. Here, the data blocks 230 may include a b number of data blocks. In this instance, b denotes a predetermined positive integer, and may be determined based on a number of hops between a transmitter and a receiver in a network.

In particular, the encoder 210 may encode the data blocks 230 corresponding to a single identical long message using independent codes to generate multiple codewords 240, 250, and 260.

For example, the encoder 210 may generate multiple codewords including a first codeword 240 and a second codeword 250. For example, referring to FIG. 2C, the encoder 210 may generate a first codeword 240 using multiple data blocks 230. Further, the encoder 210 may generate a second codeword 250 using multiple data blocks 230.

In this instance, the encoder 210 may encode the data blocks 230 using a first code to generate the first codeword 240, and encode the data blocks 230 using a second code to generate the second codeword 250. Here, the number of codewords generated by the encoder 210 corresponds to the number of multiple data blocks 230. This allows the receiver to be able to restore the information included in the multiple data blocks 230.

Figure 2D:
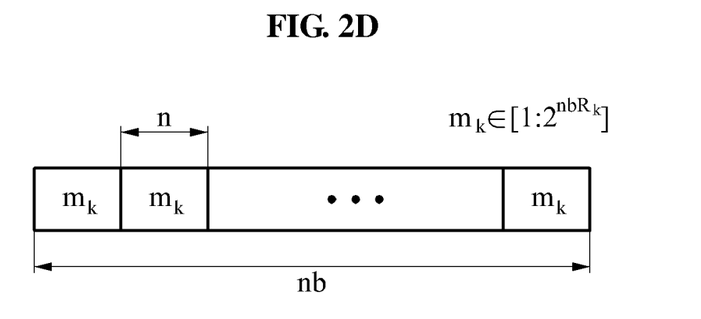

Referring to FIG. 2D, the data blocks 230 may include a b number of data blocks, and each of the data blocks may include data $m_k$, where the length of each data block corresponds to n. In this instance, the data $m_k$ may have a value of one of a $2^{nbR\_k}$ number of elements. Here, R_k may include a data transmission rate when each data block is transmitted.

Figure 2E:
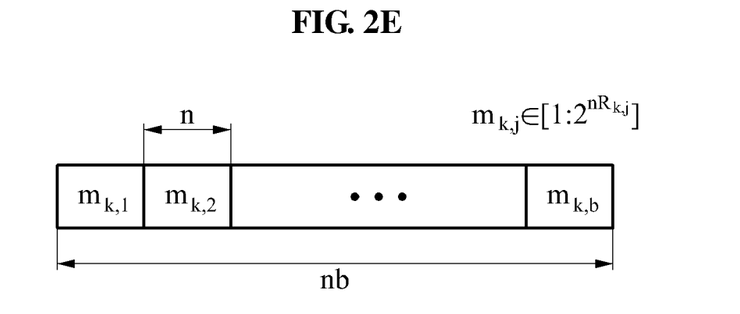

Referring to FIG. 2E, according to another exemplary embodiment, the encoder 210 may employ block Markov encoding or hashing to reduce a size of constellation when modulation is performed. The block Markov encoding may refer to a scheme of partitioning a long message into multiple blocks, and encoding a message corresponding to each block using an independent code.

In this instance, the data blocks 230 may include a b number of data blocks, and each of the data blocks may include data $m_{k,j}$ of which a length corresponds to n. The data $m_{k,j}$ may have a value of one of a $2^{nbR\_k,j}$ number of elements. Here, R_k,j may include a data transmission rate when a $j^{th}$ data block is transmitted.

Referring to FIG. 2A again, the modulator 220 may modulate the multiple codewords generated by the encoder 210 to generate multiple modulated signals, respectively. In this instance, the modulator 220 may determine a modulation scheme, based on a length of a codeword generated by the encoder 210 and a number of symbols included in a modulated signal generated by the modulator 220. Here, the length of the codeword may correspond to, for example, N, and the number of the symbols may correspond to, for example, n.

The number of symbols included in the modulated signal may be determined based on a state of the network, and the like. In addition, the number of symbols included in the modulated signal may be determined to be identical to a number of symbols to be transmitted over the network when short message encoding is employed.

The length of the codeword generated by the encoder 210 may be greater than the number of the symbols included in the modulated signal, or may be less than the number of the symbols included in the modulated signal depending on cases. For example, the length of the codeword may vary depending on a combination of an encoding scheme employed by the encoder 210 and a modulation scheme employed by the modulator 220.

For example, the length of the codeword generated by the encoder 210 may correspond to N, and the number of the symbols included in the modulated signal may correspond to n. In this instance, the modulator 220 may employ a $2^{N/n}$-ary modulation scheme.

According to another exemplary embodiment, as shown in dashed lines in FIG. 2A, the transmitter 200 may further include a transmitter 225 to multicast the modulated signal generated by the modulator 220 to multiple relays. In this instance, the multiple relays may relay the signal multicasted by the transmitter 225, based on a network compress-and-forward scheme. A detailed description on the network compress-and-forward scheme will be provided with reference to FIGS. 3A and 3B.

According to still another exemplary embodiment, again a shown in dashed lines in FIG. 2A, the transmitter 200 may further include a network type determiner 215, and a single block encoder 217. Here, the network type determiner 215 may determine a type of a network associated with a length of a path between the transmitter 200 and a receiver. The single block encoder 217 may receive an input of a single data block based on the network type determined by the network type determiner 215, and encode the corresponding data block to generate a codeword corresponding to the data block. In this instance, the modulator 220 may module the codeword generated by the single block encoder 217.

For example, when lengths of multiple paths formed by the multiple relays between the transmitter 200 and the receiver are identical, the network type determiner 215 may determine that the type of the network corresponds to a layered network. In this instance, the transmitter 200 may encode a single data block using the single block encoder 217, rather than performing the long message encoding. The single block encoder 217 may encode the single data block using an error control code that is used in a point-to-point (p2p) communication.

FIGS. 3A to 3D are block diagrams illustrating a relay according to an exemplary embodiment.

Figure 3A:
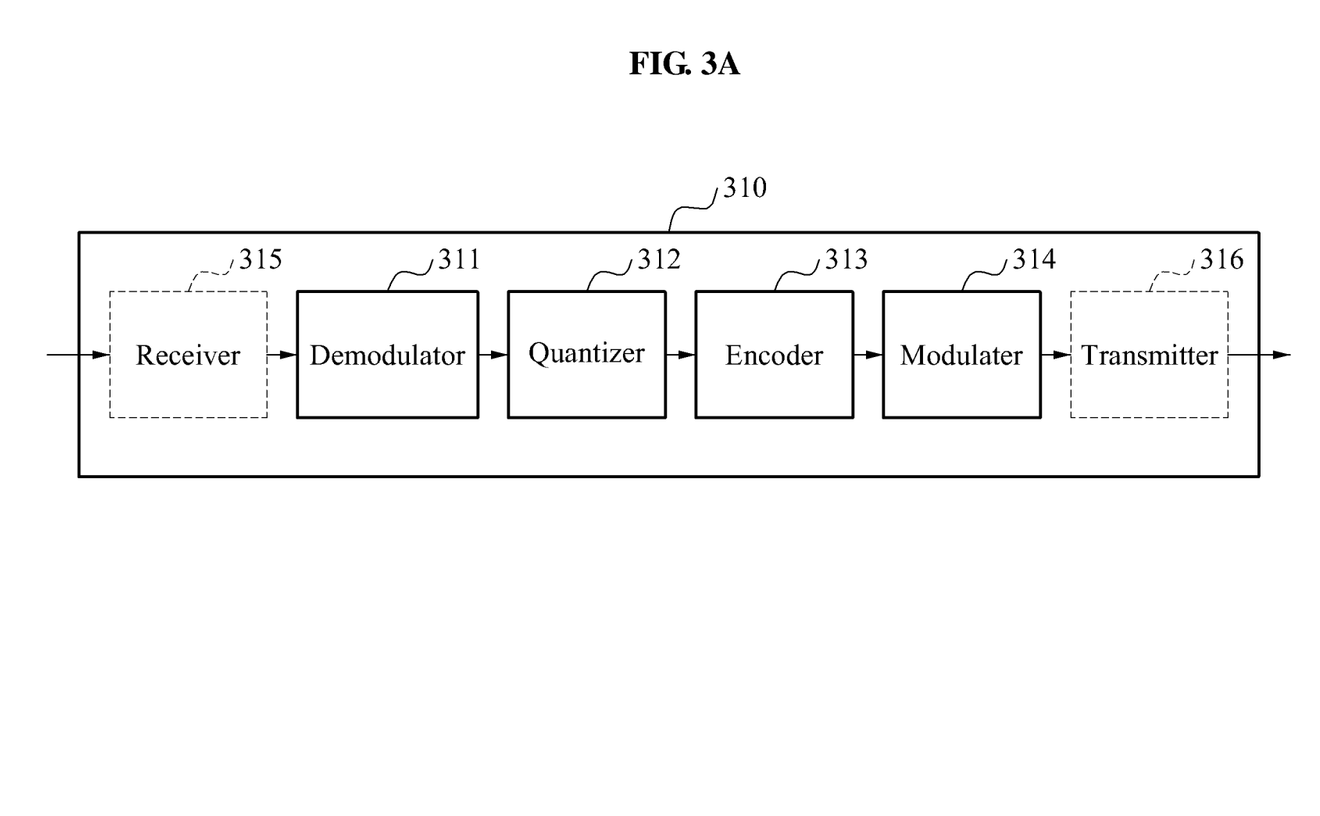
FIGS. 3A through 3D are block diagrams illustrating examples of relays according to exemplary embodiments.

Referring to FIG. 3A, a relay 310 may relay a data block transmitted from at least one transmitter to at least one receiver, in a network including at least one transmitter, multiple relays, and at least one receiver.

In this instance, the relay 310 may include a quantizer 312, an encoder 313, and a modulator 314. As shown in FIG. 3A using dashed lines, the relay 310 may further include a receiver 315, and a transmitter 316.

The receiver 315 may receive a radio signal including a data block transmitted by at least one transmitter. In this instance, the receiver 315 may receive the radio signal directly from at least one transmitter, or may receive a radio signal relayed by another relay depending on a particular case.

The quantizer 312 may demodulate the received signal, and quantize the demodulated signal based on a predetermined compression level. Depending on a particular case, the relay 310 may include a separate demodulator 311 to demodulate the received signal. In this instance, the demodulator 311 may demodulate the signal received by the receiver 315.

Figure 3B:
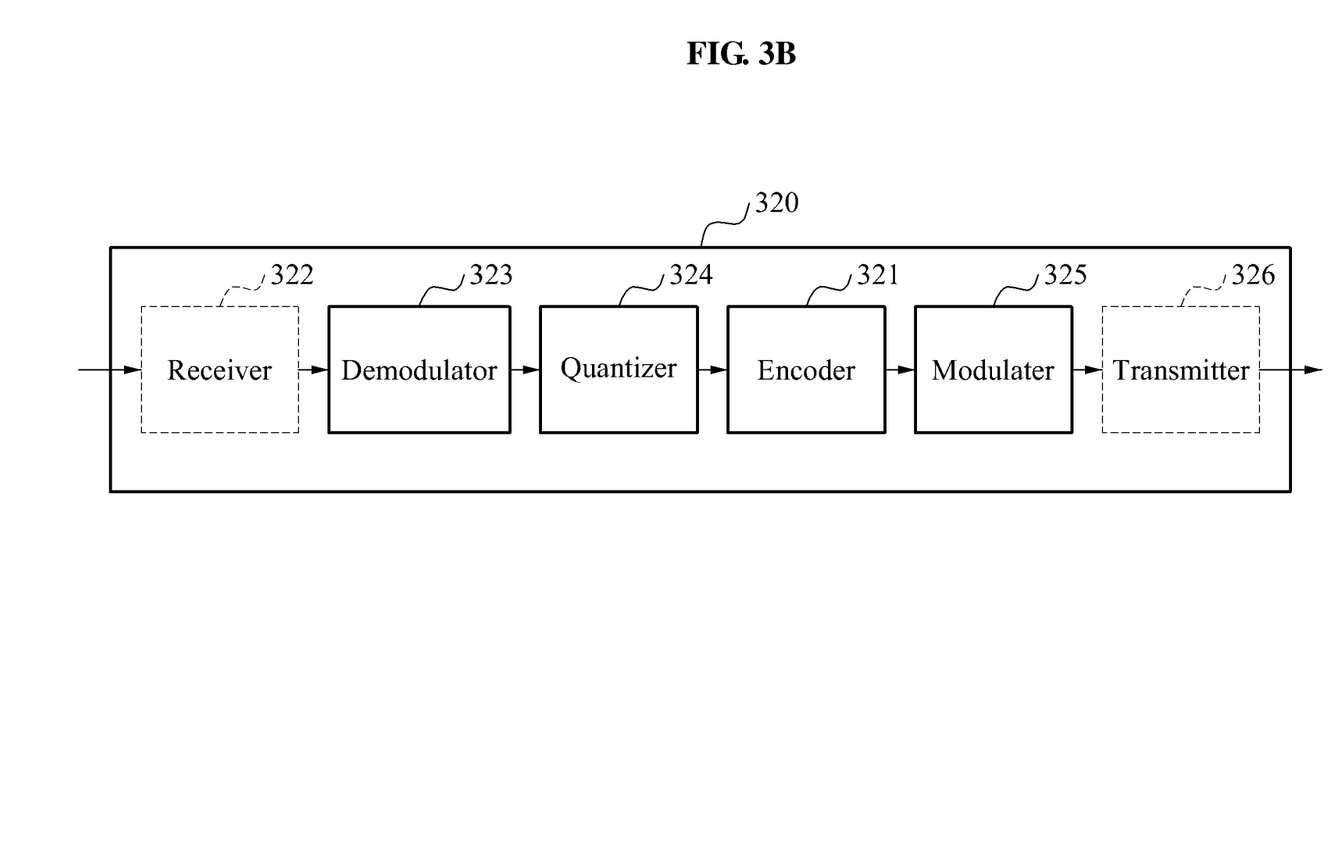
Figure 3C:
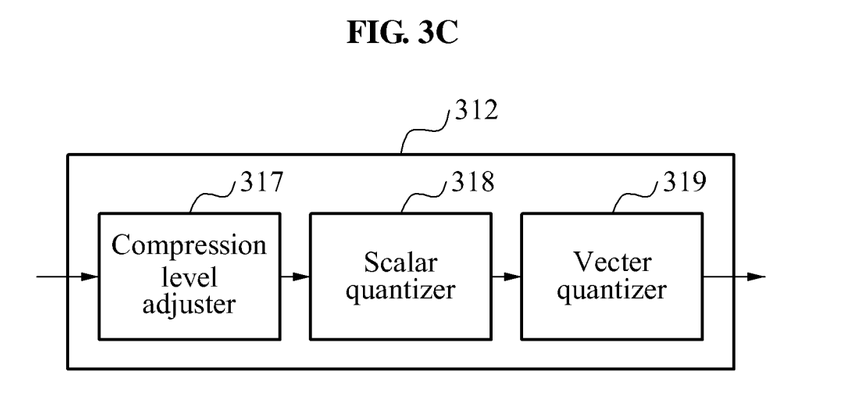

In addition, the quantizer 312 may quantize the demodulated signal based on the predetermined compression level. In this instance, the quantizer 312 may include a compression level adjuster 317 as shown in FIG. 3C that adjusts the predetermined compression level, based on a desired rate of the network. For example, the compression level adjuster 317 of the quantizer 312 may adjust the predetermined compression level to maximize an achievable rate of the network.

As shown in FIG. 3C, the quantizer 312 may also include at least one of a scalar quantizer 318 to quantize multiple symbols included in a demodulated signal, respectively, and a vector quantizer 319 to quantize a sequence of the multiple symbols included in the demodulated signal.

In addition, the encoder 313 may encode the quantized signal. Here, the encoder 313 may include a channel encoder.

In this instance, respective encoders included in the multiple relays included in the network may perform encoding independently. For example, FIG. 3B shows another relay 320. The relay 320 includes a receiver 322, a demodulator 323, a quantizer 324, an encoder 321, a modulator 325, and a transmitter 326. The operations of the receiver 322, the demodulator 323, the quantizer 324, the encoder 321, the modulator 325, and the transmitter 326 are substantially the same as in those shown in FIG. 3A, and thus repeated description will be omitted. As with the relay 320, the receiver 322 and transmitter 326 may be omitted.

The respective encoders included in the multiple relays may perform the encoding independently for the data block included in the received radio signal to be mapped randomly. For example, the relay 310 and a relay 320 may receive a radio signal including an identical data block. In this instance, the encoder 313 included in the relay 310 and an encoder 321 included in the relay 320 may perform encoding independently for the data block to be mapped randomly.

In addition, the modulator 314 may modulate the encoded signal, and the transmitter may transmit the modulated signal.

Figure 3D:
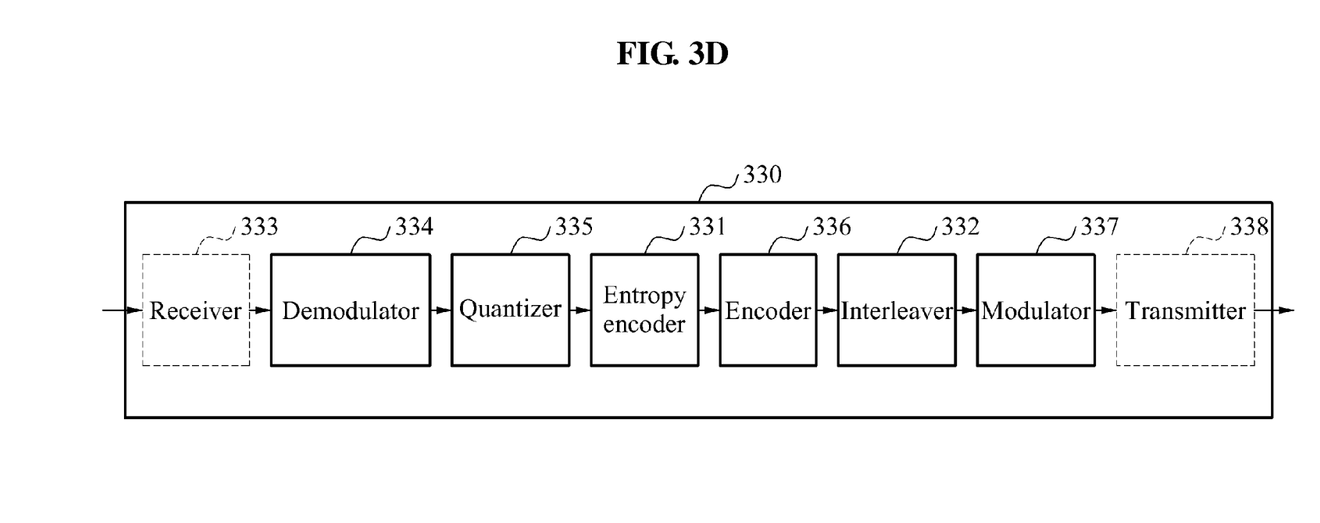

Referring to FIG. 3D, a relay is shown according to another exemplary embodiment. The relay 330 includes a receiver 333, a demodulator 334, a quantizer 335, an encoder 336, a modulator 337, and a transmitter 338. The operations of the receiver 333, the demodulator 334, the quantizer 335, the encoder 336, the modulator 337, and the transmitter 338 are substantially the same as in those shown in FIGS. 3A and 3B, and thus repeated description will be omitted. As shown in FIG. 3D, the relay 330 may further include an entropy encoder 331, and an interleaver 332.

The entropy encoder 331 may perform entropy encoding with respect to a signal quantized by a quantizer, for optimal compression. For example, the entropy encoder 331 may be disposed between the quantizer and an encoder.

In addition, the interleaver 332 may interleave a signal encoded by the encoder. For example, the interleaver 332 may be connected to the encoder, sequentially, to interleave encoded signals, for example, channel codes, generated independently by multiple relays.

Figure 4:
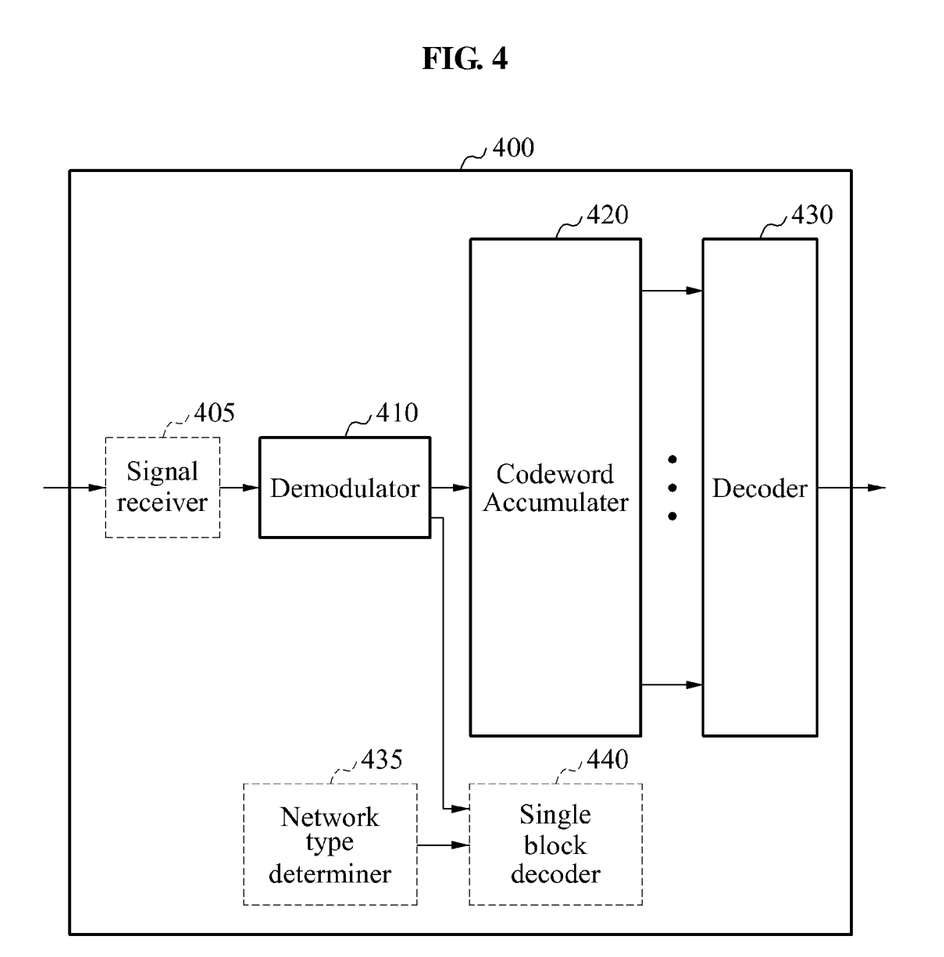
FIG. 4 is a block diagram illustrating examples of receivers according to exemplary embodiments.

FIG. 4 is a block diagram illustrating a receiver according to an exemplary embodiment.

Referring to FIG. 4, a receiver 400 may include a demodulator 410, a codeword accumulator 420, and a decoder 430. As shown in FIG. 4 using dashed lines, the receiver 400 may further include a signal receiver 405.

The signal receiver 405 may receive a signal in which multiple radio signals relayed by multiple relays are superposed.

For example, a signal multicasted by a transmitter T1 may be received by a relay L1 and a relay L2. The relay L1 may relay the received signal to a relay L3, and the relay L2 and the relay L3 may transmit the received signals to a receiver R1. In this instance, the receiver R1 may receive a signal in which the signals transmitted by the relay L2 and the relay L3 are superposed. That is, multiple arrows pointing in a direction of the receivers 130 illustrated in FIG. 1 denote multiple relay signals transmitted by the relays 120, and each of the receivers 130 may receive the signal in which such multiple relay signals are "superposed."

As another example, a signal multicast by the transmitter T1 and a signal multicast by a transmitter T2 may be received by the relay L1 and the relay L2, respectively. In this instance, the relay L1 and the relay L2 may receive a signal in which the signals transmitted by the transmitter T1 and the transmitter T2 are superposed. The relay L1 may relay the received signal to the relay L3, and the relay L2 and the relay L3 may transmit the received signals to the receiver R1 and a receiver R2. The receiver R1 and the receiver R2 may receive a signal in which the signals transmitted by the relay L2 and the relay L3 are superposed.

The demodulator 410 may demodulate the signal received by the receiving unit to generate a codeword, and the codeword accumulator 420 may accumulate a predetermined number of codewords. For example, a transmitter may perform long message encoding using a b number of data blocks, and each of the data blocks may include an n number of symbols. In this instance, the codeword accumulator 420 may accumulate a total of an n×b number of symbols.

In addition, the decoder 430 may perform joint decoding with respect to the accumulated plurality of codewords to generate multiple data blocks. When the predetermined number of codewords are accumulated, the codeword accumulator 420 may report to the decoder 430, that the predetermined number of codewords are accumulated. The decoder 430 may perform the joint decoding, in response to the report from the codeword accumulator 420.

In this instance, the decoder 430 may employ various schemes related to the joint decoding. For example, the decoder 430 may perform joint decoding, using a maximum a posteriori probability (MAP) scheme, a maximum likelihood (ML) scheme, a message-passing scheme, or the like.

In addition, the decoder 430 may generate data blocks corresponding to respect signals transmitted by different transmitters, simultaneously, using joint decoding. For example, a signal received by the receiving unit may include data blocks transmitted by multiple transmitters. In this instance, the decoder 430 may employ the above-described joint decoding to generate the data blocks corresponding to the respective plurality of transmitters, simultaneously.

In addition, according to another exemplary embodiment, the decoder 430 may not decode a compression index at each of the multiple relays.

As shown in FIG. 4 using dashed lines, according to still another exemplary embodiment, the receiver 400 may further include a network type determiner 435, and a single block decoder 440. Here, the network type determiner 435 may determine a type of a network associated with a length of a path between a transmitter and the receiver 400. The single block decoder 440 may decode a codeword generated by the demodulator 410, based on a result determined by the network type determiner 435.

For example, when lengths of multiple paths formed by the multiple relays between the transmitter and the receiver 400 are identical, the network type determiner 435 may determine that the type of the network corresponds to a layered network. In this instance, the receiver 400 may decode a single data block using the single block decoder 440, rather than performing joint decoding. The single block decoder 440 may decode the single data block using sequential decoding.

The method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa. Moreover, the transmitter, receiver, and relay according to the exemplary embodiments may be implemented using one or more microprocessors in conjunction with one or more memories.

Although a few exemplary embodiments have been shown and described, the exemplary embodiments are not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A receiving device comprising:
a receiver configured to receive a signal in which multiple radio signals relayed by multiple relays are superposed;
a demodulator configured to demodulate the received signal to generate a codeword;
an accumulator configured to accumulate a predetermined number of codewords; and
a decoder configured to apply joint decoding to the accumulated codewords to decode simultaneously data packets received from the multiple relays to generate multiple data blocks;
wherein each of the multiple radio signals corresponds to the codeword, and each of the codewords is generated by encoding the same multiple data blocks using a corresponding independent code, and
wherein each of the multiple relays is configured to receive a multicasted signal from a transmitter, encode the multicasted signal using a encoding scheme independent from encoding schemes of other relays to generate a random-mapped signal of the multiple data blocks, and relay the random-mapped signal of the multiple data blocks.

2. The receiving device of claim 1, wherein the multiple radio signals comprise signals transmitted from different transmitters, and the data blocks generated by the at least one processor correspond to the transmitted signals, respectively.

3. The receiving device of claim 1, further comprising:
a network type determiner configured to determine a type of a network associated with a length of a path between a transmitter and the receiver; and
a single block decoder configured to decode the generated codeword in response to the type of the network determined by the network type determiner being indicated as a layered network.

4. The device of claim 1, wherein the multicasted signal is generated by the transmitter based on a long message encoding scheme by encoding the same multiple data blocks using the corresponding independent code.

5. A cooperative communication system comprising:
a transmitting device configured to generate a plurality of codewords from a plurality of data blocks based on a long message encoding scheme, each of the codewords generated by encoding the same multiple data blocks using a corresponding independent code, and multicast a signal including the codewords;
a plurality of relaying devices, each relaying device configured to receive the multicasted signal, encode the multicasted signal using a encoding scheme independent from encoding schemes of other relaying devices to generate a random-mapped signal of the plurality of data blocks, and relay the random-mapped signal of the plurality of data blocks; and
a receiving device configured to receive a signal in which multiple radio signals relayed by multiple relaying devices are superposed, accumulate the received signal, and apply joint decoding to the accumulated signal to decode simultaneously data packets received from the multiple relays to generate the plurality of data blocks from the plurality of signals.

6. The cooperative communication system of claim 5, wherein the receiving device is configured to receive a signal comprising at least two signals relayed by the relaying devices that are superimposed.

7. The cooperative communication system of claim 5, wherein the transmitting device comprises:
an encoder configured to receive an input of the plurality of data blocks, and encode the plurality of data blocks to generate the plurality of codewords; and
a modulator configured to modulate the plurality of codewords, respectively, to generate a plurality of modulated signals,
wherein the encoder is configured to encode the plurality of data blocks, in an independent manner, to generate the plurality of codewords, respectively.

8. The cooperative communication system of claim 7, wherein each of the plurality of relaying devices comprises:
a receiver configured to receive a radio signal comprising the data blocks;
a demodulator configured to demodulate the received signal;
a quantizer configured to quantize the demodulated signal based on a predetermined compression level;
an encoder configured to encode the quantized signal;

a modulator configured to modulate the encoded signal; and a transmitter configured to transmit the modulated signal, wherein respective encoders of the plurality of relaying devices perform encoding independently.

9. The cooperative communication system of claim 8, wherein the receiving device comprises:

a receiver configured to receive a signal in which a plurality of radio signals relayed by the plurality of relaying devices are superposed;

a demodulator configured to demodulate the received signal to generate a codeword;

an accumulator configured to accumulate a predetermined number of codewords; and a decoder configured to apply joint decoding to the accumulated codewords to decode simultaneously the data packets received from the multiple relays to generate the multiple data blocks.

10. The cooperative communication system of claim 5, wherein the receiving device is configured to accumulate a signal corresponding to a predetermined length, the signal being a signal in which a plurality of signals relayed by the plurality of relaying devices are superposed, and restore the plurality of data blocks by applying the joint decoding with respect to the accumulated signal.

11. A communicating method comprising:

receiving a first signal in which first multiple radio signals relayed by multiple relays are superposed;

demodulating the first signal to generate a first codeword;

accumulating the first codeword;

receiving a second signal in which second multiple radio signals relayed by the multiple relays are superposed;

demodulating the second signal to generate a second codeword;

accumulating the second codeword; and decoding simultaneously the accumulated first and second codewords to generate multiple data blocks, wherein each of the first multiple radio signals corresponds to the first codeword, each of the second multiple radio signals corresponds to the second codeword, and each of the first and second codewords is generated by encoding the same multiple data blocks using a corresponding independent code, and wherein each of the multiple relays is configured to receive a multicasted signal from a transmitter, encode the multicasted signal using a encoding scheme independent from encoding schemes of other relays to generate a random-mapped signal of the multiple data blocks, and relay the random-mapped signal of the multiple data blocks.

12. The method of claim 11, the decoding of the accumulated first and second codewords comprises:

determining a type of a network associated with a length of a path between a transmitter and a receiver; and decoding the first codeword or the second codeword in response to the type of the network determined by the network type determiner being indicated as a layered network.

13. The method of claim 11, wherein the first and second multiple radio signals comprise signals transmitted from different transmitters, and the data blocks generated by the at least one processor correspond to the transmitted signals, respectively.

14. The method of claim 11, wherein the multicasted signal is generated by the transmitter based on a long message encoding scheme by encoding the same multiple data blocks using the corresponding independent code.

15. A non-transitory computer-readable medium comprising a program for instructing a computer to perform a method comprising:

receiving a first signal in which first multiple radio signals relayed by multiple relays are superposed;

demodulating the first signal to generate a first codeword;

accumulating the first codeword;

receiving a second signal in which second multiple radio signals relayed by the multiple relays are superposed;

demodulating the second signal to generate a second codeword;

accumulating the second codeword; and decoding simultaneously the accumulated first and second codewords to generate multiple data blocks, wherein each of the first multiple radio signals corresponds to the first codeword, each of the second multiple radio signals corresponds to the second codeword, and each of the first and second codewords is generated by encoding the same multiple data blocks using a corresponding independent code, and wherein each of the multiple relays is configured to receive a multicasted signal from a transmitter, encode the multicasted signal using a encoding scheme independent from encoding schemes of other relays to generate a random-mapped signal of the multiple data blocks, and relay the random-mapped signal of the multiple data blocks.

* * * * *